(12) United States Patent
Barsness et al.

(10) Patent No.: US 7,392,266 B2
(45) Date of Patent: Jun. 24, 2008

(54) APPARATUS AND METHOD FOR MONITORING USAGE OF COMPONENTS IN A DATABASE INDEX

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 11/082,924

(22) Filed: Mar. 17, 2005

(65) Prior Publication Data

US 2006/0212264 A1     Sep. 21, 2006

(51) Int. Cl.
*G06F 12/00* (2006.01)
*G06F 17/30* (2006.01)

(52) U.S. Cl. .................................... 707/200
(58) Field of Classification Search .............. 707/5, 707/101, 200
See application file for complete search history.

(56) References Cited

U.S. PATENT DOCUMENTS

| | | | |
|---|---|---|---|
| 5,899,988 A * | 5/1999 | Depledge et al. ............. 707/3 |
| 6,353,821 B1 | 3/2002 | Gray | |
| 6,353,826 B1 | 3/2002 | Seputis | |
| 6,421,662 B1 | 7/2002 | Karten | |
| 6,457,014 B1 | 9/2002 | Parker | |
| 6,466,942 B1 | 10/2002 | Tolkin | |
| 6,496,830 B1 | 12/2002 | Jenkins, Jr. | |
| 6,778,985 B1 | 8/2004 | Jenkins, Jr. | |
| 2003/0093408 A1 | 5/2003 | Brown et al. | |
| 2003/0204513 A1 | 10/2003 | Bumbulis | |
| 2004/0181521 A1 | 9/2004 | Simmen | |
| 2004/0236656 A1 | 11/2004 | Megale et al. | |

* cited by examiner

*Primary Examiner*—Charles Rones
*Assistant Examiner*—Alicia M Lewis
(74) *Attorney, Agent, or Firm*—Martin & Associates

(57) ABSTRACT

Database indexes include multiple fields that are used to track how the components of the index are used. An index component monitoring mechanism tracks how the components of the index are used, and updates fields in the index accordingly. Such component-level statistics allow a query optimizer to make more intelligent decisions regarding when to build a new index and when to discard an index, and also provide information regarding which queries are using the index, the maintenance cost of the index, and the selectivity of the index when used to process a query.

1 Claim, 9 Drawing Sheets

Table JMS/TESTDATA

| timestamp | elapsed_time | record_type | results | duration | operation_type | userid |
|---|---|---|---|---|---|---|
| 11:14:02 | 112 | 1000 | 0 | S | FIND | SANTO |
| 11:14:02 | 167 | 1000 | 0 | S | CLOSE | SANTO |
| 11:14:02 | 205 | 1000 | 0 | S | FIND | SANTIAGO |
| 11:14:02 | 219 | 1000 | 0 | S | FIND | SANTO |
| 11:14:02 | 1 | 1000 | 0 | S | OPEN | SANTO |
| 11:14:02 | 8 | 1000 | 0 | S | SEARCH | SANTO |
| 11:14:02 | 123 | 1000 | 0 | S | SEARCH | SANTO |
| 11:14:02 | 9 | 1000 | 5 | S | REPLACE | SANTO |
| 11:14:02 | 4564 | 3000 | 6 | S | REPLACE | MARSH |
| 11:14:02 | 34876 | 3000 | 7 | S | REPLACE | MARSH |
| 11:14:02 | 123 | 1000 | 0 | S | OPEN | SANTO |
| 11:14:02 | 876 | 1000 | 0 | L | OPEN | SANTO |
| 11:14:02 | 567 | 1000 | 0 | L | CLOSE | SANTO |
| ... | ... | ... | ... | ... | ... | ... |
| 11:14:02 | 876 | 1000 | 0 | L | CLOSE | WILLIAM |

CREATE INDEX JSM/Index1 ON JMS/TESTDATA (record_type)
CREATE ENCODED VECTOR INDEX JSM/evi_1 ON JMS/TESTDATA (record_type)
CREATE ENCODED VECTOR INDEX JSM/evi_2 ON JMS/TESTDATA (results)
CREATE ENCODED VECTOR INDEX JSM/evi_3 ON JMS/TESTDATA (duration)
CREATE ENCODED VECTOR INDEX JSM/evi_4 ON JMS/TESTDATA (userid)
CREATE INDEX JSM/Index2 ON JMS/TESTDATA (userid,operation_type,results, record_type)
CREATE INDEX JSM/Index3 ON JMS/TESTDATA (elapsed_time)
CREATE INDEX JSM/Index4 ON JMS/TESTDATA (userid)

FIG. 3

SELECT * FROM JMS/TESTDATA WHERE record_type = 1000

FIG. 4

SELECT * FROM JMS/TESTDATA WHERE duration = 'S' and operation_type = 'CLOSE'

FIG. 5

SELECT * FROM JMS/TESTDATA WHERE userid = 'SANTIAGO' and
operation_type = 'CLOSE' and record_type = '1000'

FIG. 6

APPARATUS AND METHOD FOR MONITORING USAGE OF COMPONENTS IN A DATABASE INDEX

BACKGROUND OF THE INVENTION

1. Technical Field

This invention generally relates to computer systems, and more specifically relates to database apparatus and methods.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

One way to improve the performance of a query is to use an index. An index is a data structure that allows more efficiently locating data in a table. A query optimizer may evaluate a query and determine that building an index for a table will help the query run faster. One problem that exists is the proliferation of indexes over time. In large database systems, each table may have dozens of indexes associated with the table that have been generated over time by the query optimizer to run different queries on the table. In the prior art, there is a timestamp in the index that allows determining the last time an index was used. If the index has not been used for some predetermined time threshold, the index may be discarded. Note, however, that an index may provide statistics to the query optimizer that aid in processing a query, without the index being used to process the query. Because the last used timestamp of an index is not updated when an index is used to provide statistics, but is only updated when an index is used to run a query, the last used timestamp does not truly indicate the last time the query optimizer might have used the index to provide statistics. Deleting an index based on the last used timestamp thus may result in deleting an index that the query optimizer uses often to provide statistics in determining how to execute a query.

Another problem with the prior art is the selection of a time threshold for discarding indexes. Is an index too old if it has not been used for a month? Or is three months, or six months a better threshold? The selection of a last used threshold is somewhat arbitrary. In addition, the last used threshold does not indicate how the index was used. For example, an index that includes four columns may be used often in running a query against only one of the four columns. In this case, the index is used often, but is an inefficient index for executing the query. The query optimizer would do better to build a new index for the one column in the query, and discard the old index that includes four columns. However, there is no way to know which portions of an index are used. Without a way to track how components within an index are used, the database industry will continue to suffer from inefficient methods for determining when to build and index and when to discard an index.

DISCLOSURE OF INVENTION

According to the preferred embodiments, database indexes include multiple fields that are used to track how the components of the index are used. An index component monitoring mechanism tracks how the components of the index are used, and updates fields in the index accordingly. Such component-level statistics allow making more intelligent decisions regarding when to build a new index and when to discard an index, and also provide information regarding which queries are using the index, the maintenance cost of the index, and the selectivity of the index when used to process a query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a sample database table to illustrate the concepts of the preferred embodiments;

FIG. 3 shows pseudo-code that is used to create eight different indexes for the table in FIG. 2;

FIG. 4 is a first sample query that could be run against the table in FIG. 2;

FIG. 5 is a second sample query that could be run against the table in FIG. 2;

FIG. 6 is a third sample query that could be run against the table in FIG. 2;

BEST MODE FOR CARRYING OUT THE INVENTION

1.0 Overview

Figure 1:
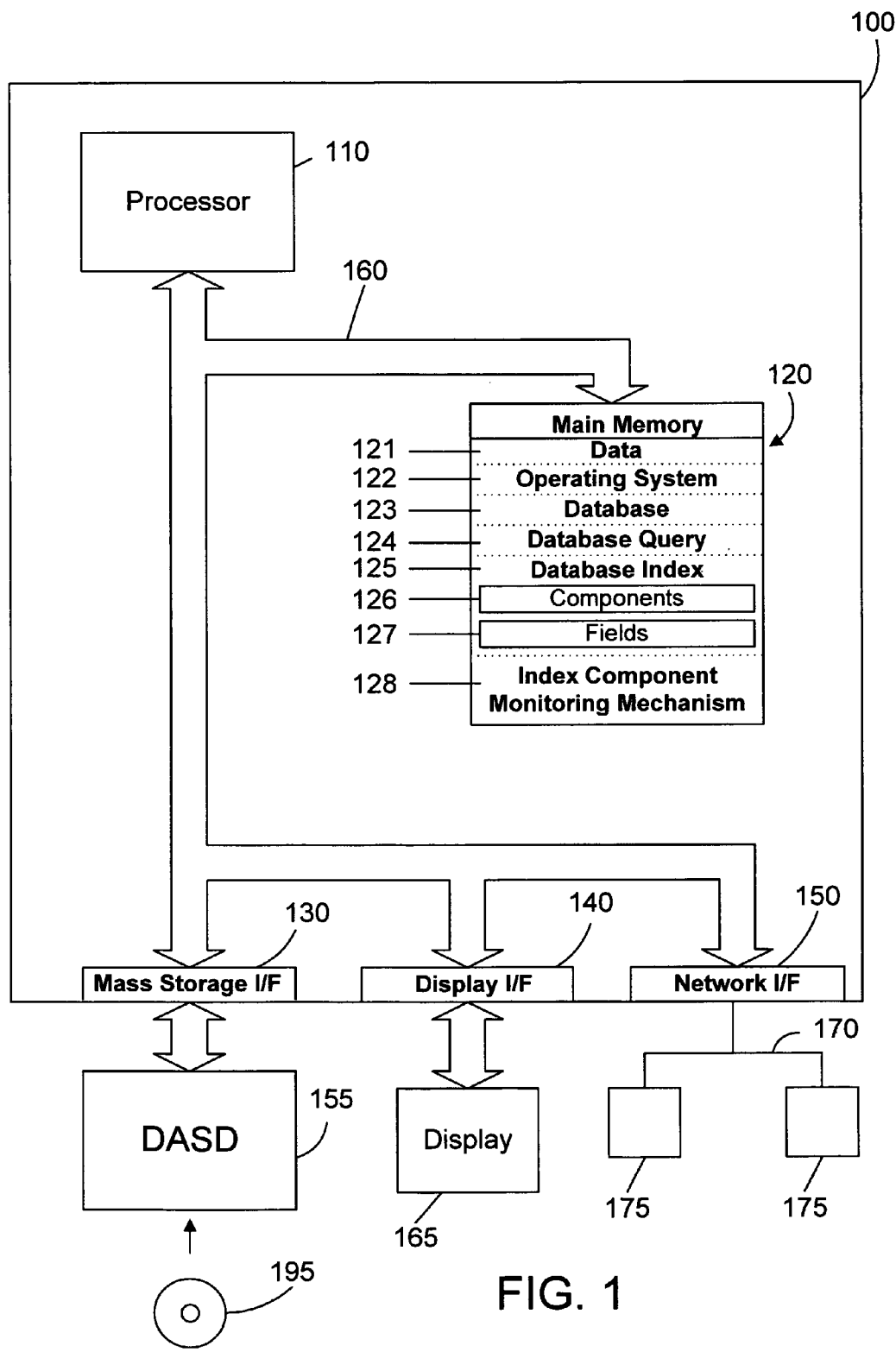
FIG. 1 is a block diagram of an apparatus in accordance with the preferred embodiments.

The present invention relates to the analysis of database queries. For those not familiar with databases or queries, this Overview section will provide background information that will help to understand the present invention.

Known Databases, Database Queries, and Indexes

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. Note that an SQL query is expressed in terms of columns defined on one or more database tables. Information about the internal storage of the data is not required as long as the query is written in terms of expressions that relate to values in columns from tables.

Indexes are often created and used by a query optimizer to speed the processing of a query. In the prior art, an index contains a timestamp indicating when the index was last used to run a query. This allows a database manager to discard indexes that are unused for a predetermined period of time. Note, however, that an index may be used by a query optimizer to gather statistics. Such uses do not update the last used timestamp, which may lead to discarding an index even though it is often used to gather statistics. In addition, there is currently no way for a query optimizer to know whether an index is being efficiently used by a query. As a result, an index may be used often to process queries, even though the index may include components (i.e., columns) that are seldom referenced by the queries.

2.0 Description of the Preferred Embodiments

The preferred embodiments allow more efficiently managing indexes by including multiple fields in an index that track how the various components of the index have been used. By collecting statistics for components of an index, it will be easier to determine how efficiently an index is being used, how often the different components of the index are used, which queries have used the index, the cost for maintaining the index, the run-time performance of the index, etc. This information may be used to create other indexes, to discard indexes, and to analyze the performance of queries that use the indexes.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, one or more database queries 124, a database index 125, and an index component monitoring mechanism 128. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Database query 124 is a query in a format compatible with the database 123 that allows retrieval of information stored in the database 123 that satisfies the database query 124. Database index 125 is an index that is built over one or more columns of a table in database 123. Database index 125 preferably includes components 126 and a plurality of fields 127. The components 126 represent columns in a database table for which the index was built. Fields 127 represent statistics that are stored in the index. These statistics include detailed information relating to the components 126.

The index component monitoring mechanism 128 monitors the usage of the database index 125, and writes information to the fields 127 that reflects how the database index 125 is used. Specifically, the index component monitoring mechanism 128 writes information to the fields 127 regarding the usage of the various different components 126 of the database index 125. By monitoring usage of the index components, more intelligent decisions may be made regarding when to discard an index, when to create a new index, and how efficiently an index is being used. Because the monitoring of the index components by the index component monitoring mechanism 128 requires system resources, the index component monitoring mechanism 128 preferably includes the capability of being turned on or turned off.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database query 124, database index 125, and index component monitoring mechanism 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

FIG. 2 shows a sample table database table 200 for illustrating the concepts of the preferred embodiments. Table 200 is entitled JBM/TESTDATA, and includes the following columns: timestamp, elapsed_time, record_type, results, duration, operation_type, and userid. The timestamp column includes a timestamp that indicates when the record was updated. We see from table 200 in FIG. 2 that all the records shown have the same timestamp, meaning that these records were all updated at the same indicated time. The elapsed_time column indicates the time in milliseconds that it took to do the operation represented in the operation_type column. The record_type column includes a numerical indication of a type of record accessed. The results column indicates the number of results returned as a result of the operation. The duration column indicates whether the operation was short (S) or long (L). The operation_type column indicates the type of operation that was performed, and includes open, close, find, search, and replace. The userid column indicates a unique identifier for the user performing the operation.

FIG. 3 shows pseudo-code for creating eight different indexes for table 200 in FIG. 2. The first CREATE statement in FIG. 3 creates an index named Index1 over the record_type column. The second CREATE statement in FIG. 3 creates an encoded vector index named JSM/evi_1 over the record_type column. The third CREATE statement in FIG. 3 creates an encoded vector index named JSM/evi_2 over the results column. The fourth CREATE statement in FIG. 3 creates an encoded vector index named JSM/evi_3 over the duration column. The fifth CREATE statement in FIG. 3 creates an encoded vector index named JSM/evi_4 over the userid column. The sixth CREATE statement in FIG. 3 creates an index named Index2 over the columns userid, operation_type, results, and record_type. The seventh CREATE statement in FIG. 3 creates an index named Index3 over the elapsed_time column. The eighth CREATE statement in FIG. 3 creates an index named Index4 over the userid column. The encoded vector indexes are typically used to provide statistics to a query optimizer, but may also be used in actually executing a query. The other indexes, namely Index1, Index2, Index3 and Index4, are indexes that may be used to execute a query.

FIG. 4 shows a sample query for table 200 in FIG. 2. In reviewing the available indexes in FIG. 3, we determine that Index1 is an index over the record_type field, and may therefore be used in executing the query in FIG. 4. FIG. 5 shows another sample query for table 200 in FIG. 2. In processing this query, the vector encoded index evi_3 in FIG. 3 may be used to provide statistics showing the large number of rows that would be returned, which help the query optimizer decide to not use an index to execute the query. FIG. 6 shows another sample query for table 200 in FIG. 2. In processing this query, the Index2 index may be used because it includes all the fields in the query. In addition, the Index2 index also includes the results column, which will have no value when using Index2 to process the query in FIG. 6.

Figure 7:
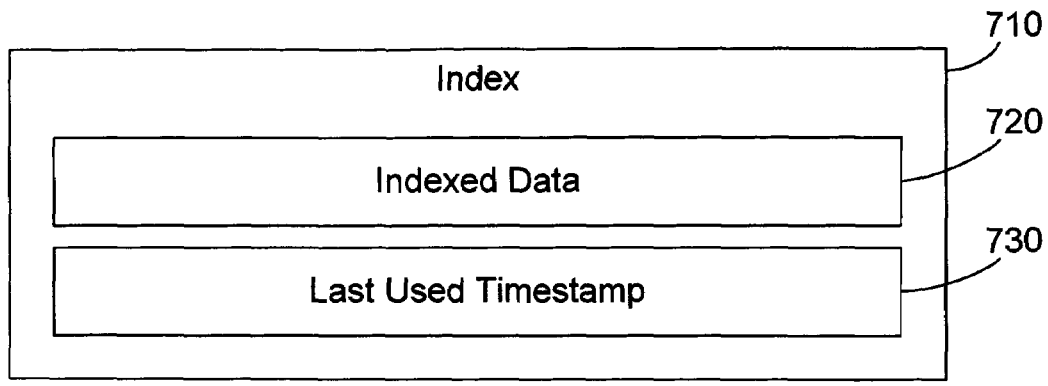
FIG. 7 is a block diagram of a prior art index.

A prior art index 710 is shown in FIG. 7. Index 710 includes indexed data 720 and a last used time stamp 730. The indexed data 720 is the actual index as is known in the art, which may be used to access data in a database table. The last used timestamp 730 specifies the last time the index was used. In the prior art index 710, there is no data regarding how components of the index have been used. The only data available in prior art index 710 relates to the time the index was last used, without regard to which components in the index 710 were used.

Figure 8:
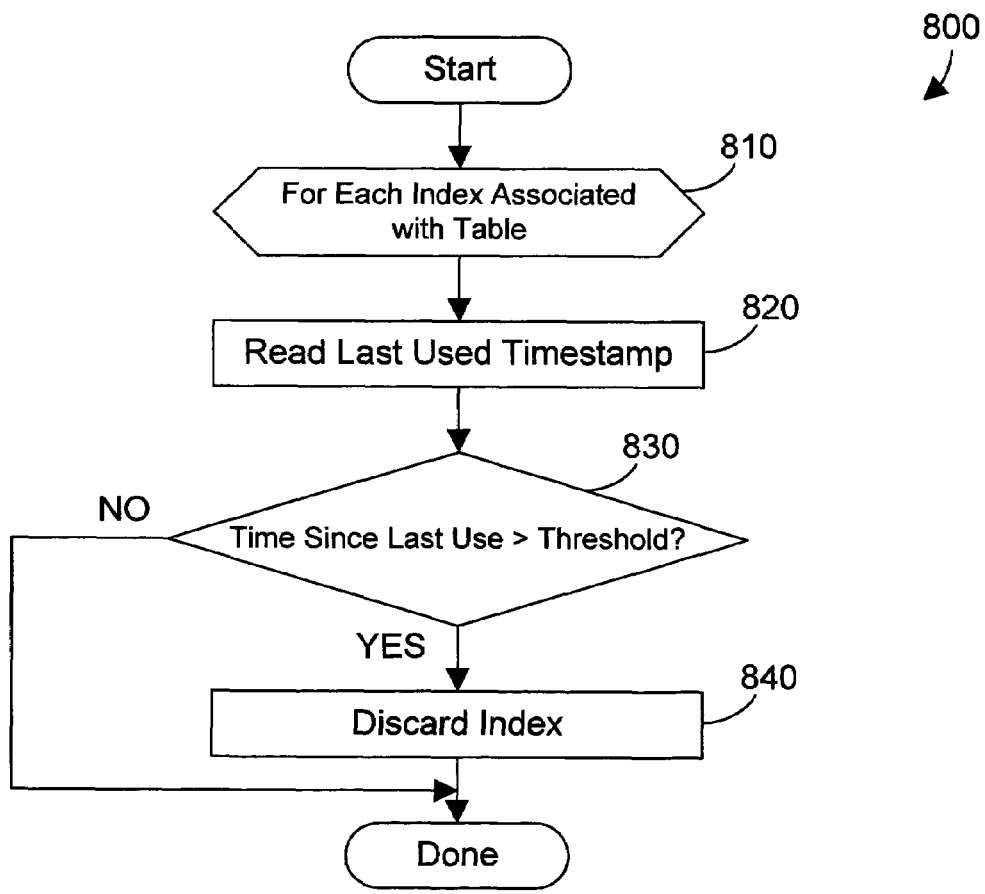
FIG. 8 is a flow diagram of a possible prior art method for determining whether to discard an index.

A method 800 in FIG. 8 shows one way the prior art may use the last used timestamp 730 in an index as shown in FIG. 7. For each index associated with the table (step 810), the last used timestamp is read (step 820). If the time since the last use is greater than some predefined threshold (step 830=YES), the index is discarded (step 840). If not (step 830=NO), method 800 is done. One skilled in the art can readily appreciate that making a decision to discard an index based on a last used timestamp can result in an index being discarded when it should not be, and can result in keeping many indexes even though many of their components are rarely or never used.

Figure 9:
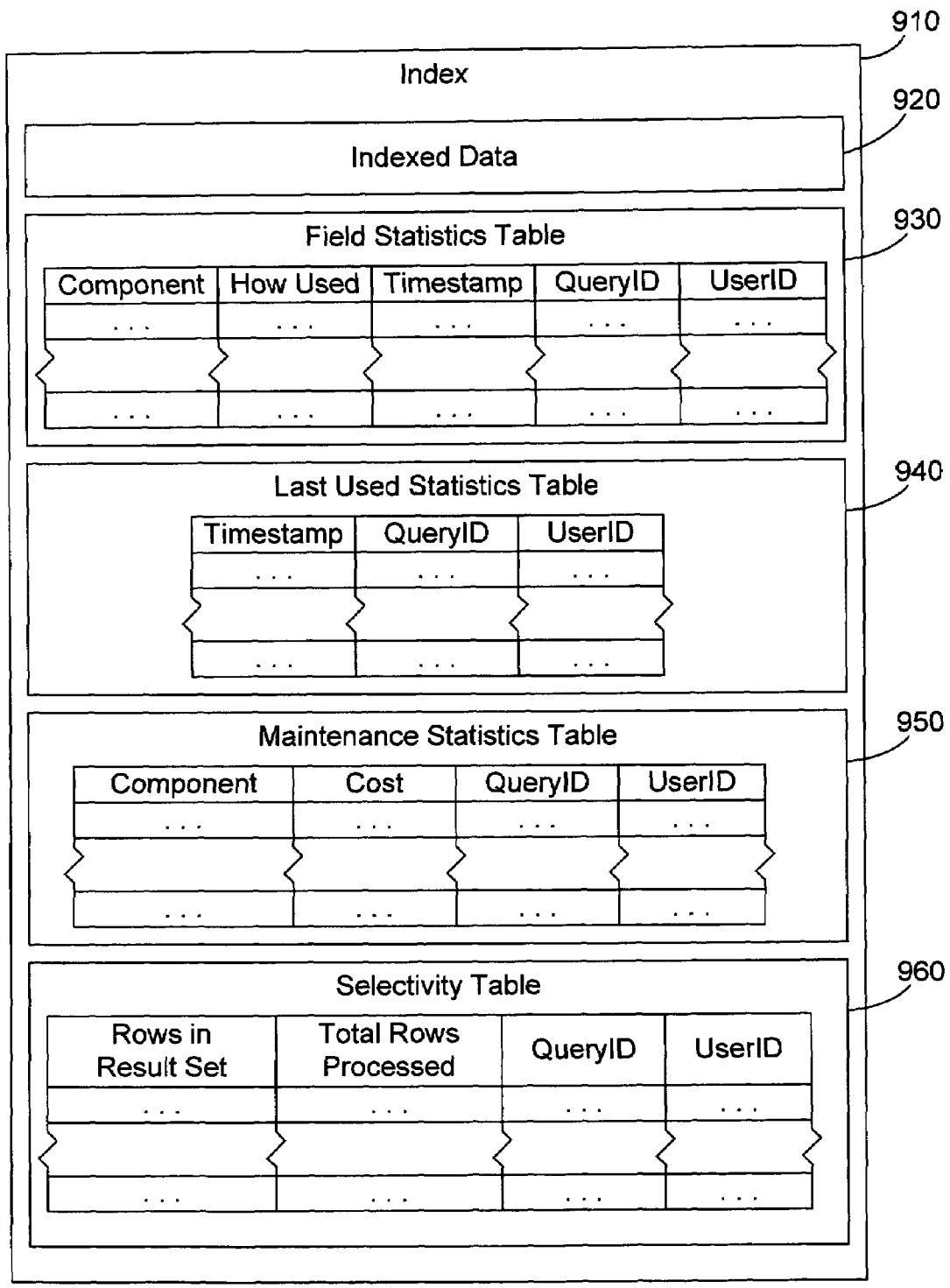
FIG. 9 is a block diagram of an index in accordance with the preferred embodiments.

The preferred embodiments provides a substantial improvement over the prior art by providing fields within an index that allow storing information regarding the usage of components in the index. Referring to FIG. 9, an index 910 in accordance with the preferred embodiments includes indexed data 920, which is preferably similar to the indexed data 720 shown in FIG. 7. Note, however, that index 910 additionally includes many fields for storing statistics and information regarding how the components of the index are used. For example, index 910 preferably includes a component statistics table 930. The component statistics table 930 keeps track of how each component in the index was used, the timestamp of the last use, the query ID that identifies the query that last used the component, and the user ID of the user that executed the query. Index 910 also preferably includes a last used statistics table 940. The last used statistics table 940 includes multiple timestamps, and includes a query ID and a userid that corresponds to each time stamp. In this manner, the index includes not only the timestamps but also the queries and users that used the index for each of the timestamps.

Index 910 also preferably includes a maintenance statistics table 950. The maintenance statistics table indicates the component involved when the index was modified, the cost for the modification, the query ID of the query that caused the index to be modified, and the user ID. Index 910 also preferably includes a selectivity table 960. The selectivity table 960 performs information that indicates how effectively the index is being used when processing a query. The selectivity table 960 preferably includes a column for the number of rows in the result set, a column for the total rows processed, and columns for the query ID and user ID. If the selectivity of a query is high, the usefulness of using the index is reduced.

Figure 10:
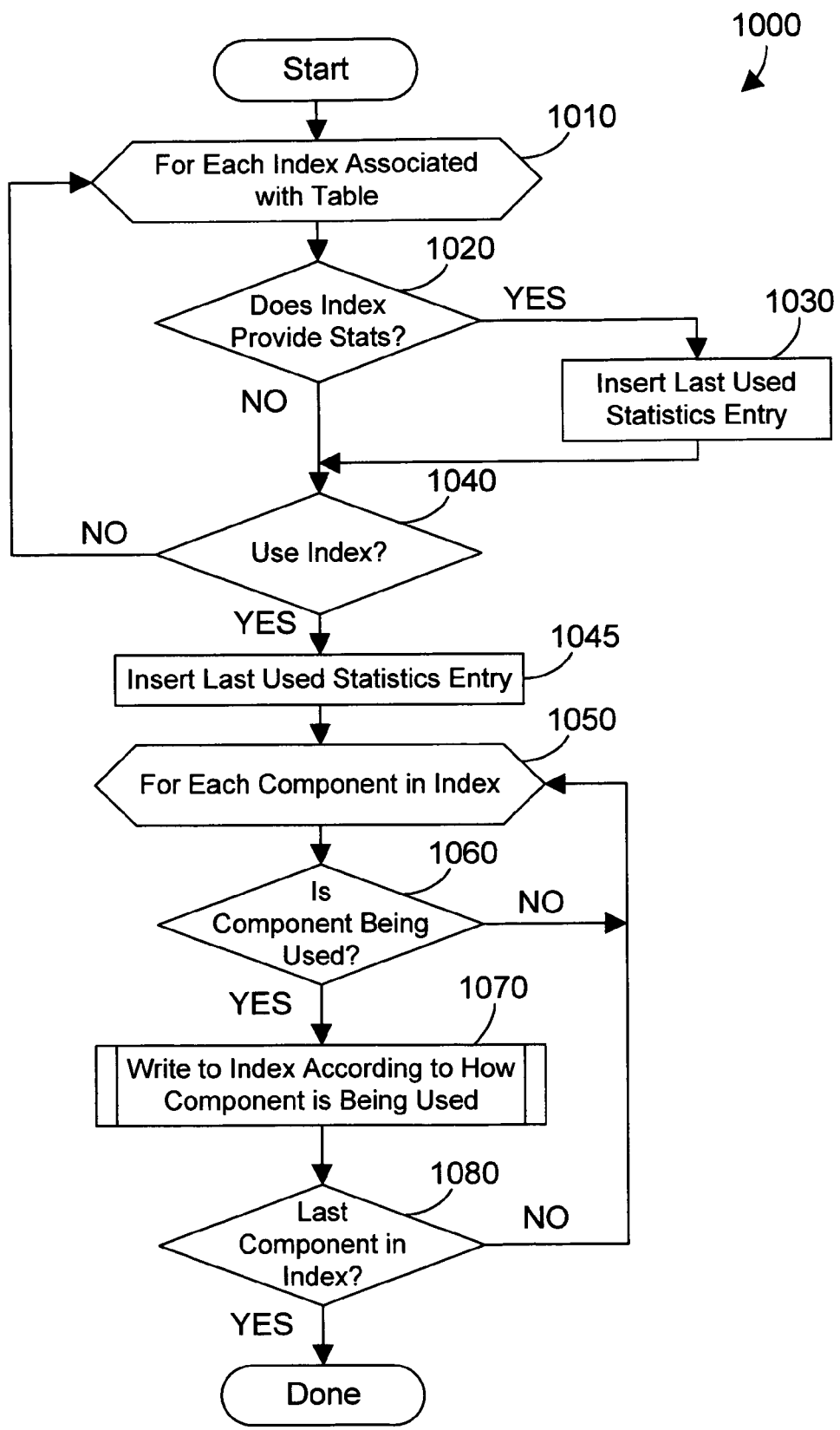
FIG. 10 is a flow diagram of a method for monitoring component usage within an index in accordance with the preferred embodiments.

Once we've defined the new index 910 in accordance with the preferred embodiments, we can store information in the index that helps determine how the index has been used. The index component monitoring mechanism 128 (FIG. 1) monitors the usage of database indexes, and stores information in the database indexes regarding the monitored usage. Method 1000 in FIG. 10 shows a method in accordance with the preferred embodiments that is preferably performed by the index component monitoring mechanism 128 in FIG. 1. For each index associated with the table (step 1010), if the index provides statistics (step 1020=YES), an entry is inserted into the last used statistics table (step 1030). This means the last used statistics table 940 in FIG. 4 is updated to include a new row that includes a timestamp and corresponding query ID. If the index is not used in processing the query (step 1040=NO), method 1000 goes back to step 1010 to consider the next index. If the index is used in processing a query (step 1040=YES), an entry is inserted into the last used statistics table (step 1045). For each component in the index (step 1050), if the component is not being used (step 1060=NO), the next component is considered. If the component is being used (step 1060=YES), the information regarding how the component is being used is written to the index (step 1070). If this is not the last component in the index (step 1080=NO), method 1000 loops back to step 1050 and continues for the next component in the index. If this is the last component in the index (step 1080=YES), method 1000 is done.

Figure 11:
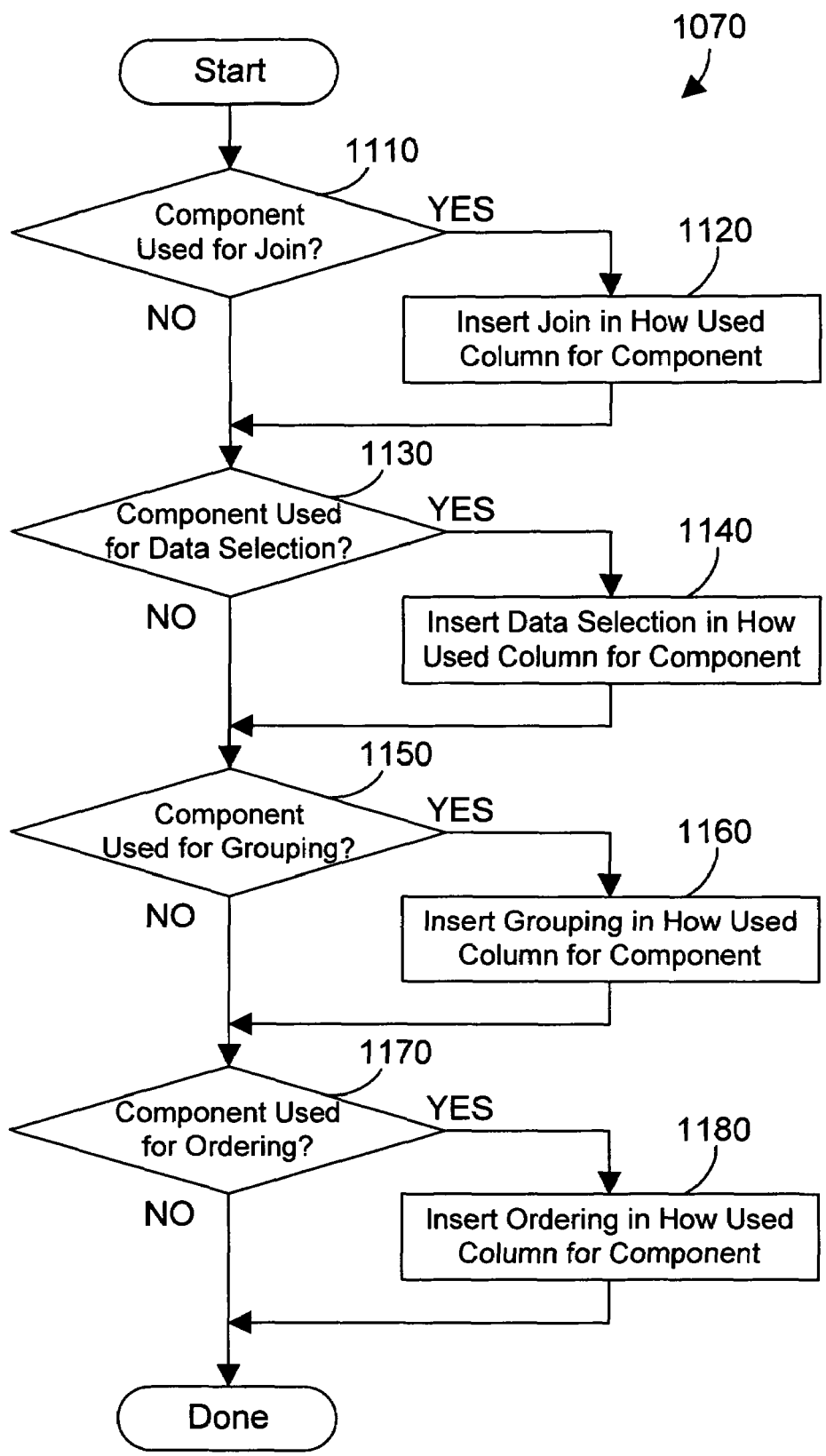
FIG. 11 is a flow diagram showing one possible implementation of step 1070 in FIG. 10 in accordance with the preferred embodiments.

FIG. 11 illustrates one possible implementation for step 1070 in FIG. 10 in accordance with the preferred embodiments. If the component was used for a join operation (step 1110=YES), a "join" is inserted in the corresponding How Used field of the Component Statistics Table 930 in FIG. 9. If the component was used for a data selection (step 1130=YES), a "data selection" is inserted in the corresponding How Used field of the Component Statistics Table 930 in FIG. 9. If the component was used for a grouping (step 1150=YES), a "grouping" is inserted in the corresponding How Used field of the Component Statistics Table 930 in FIG. 9. If the component was used for ordering (step 1170=YES), "ordering" is inserted in the corresponding How Used field of the Component Statistics Table 930 in FIG. 9. FIGS. 10 and 11 shown one possible way for the index component monitoring mechanism 128 in FIG. 1 to write information regarding the usage of components of an index to the index itself.

Figure 12:
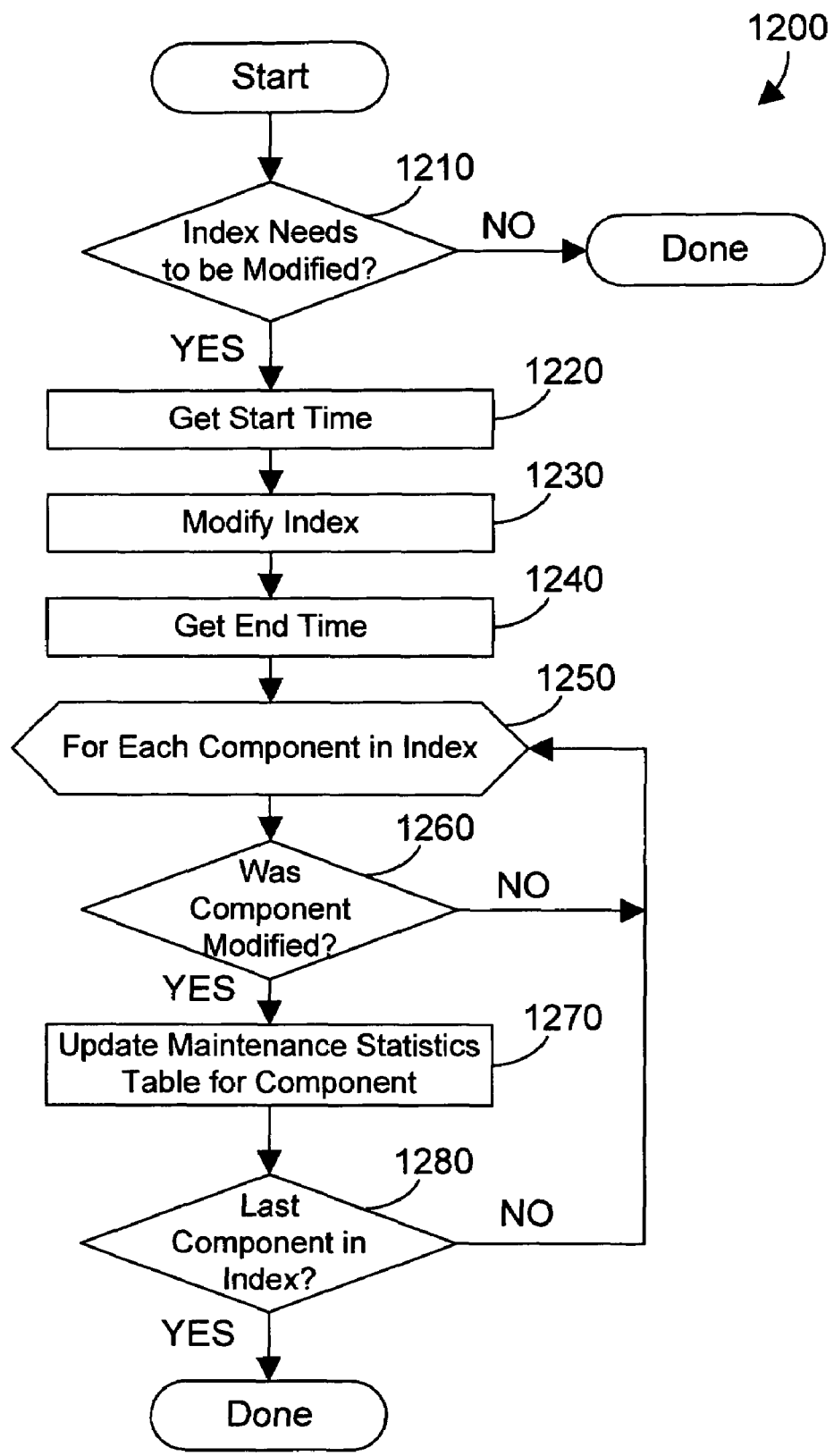
FIG. 12 is a flow diagram of a method for monitoring maintenance of components in an index in accordance with the preferred embodiments.

The index component monitoring mechanism 128 may also write information to an index relating to the maintenance of the index. Referring to FIG. 12, a method 1200 for writing such information to an index first determines whether the index needs to be modified (step 1210). If not (step 1210=NO), method 1200 is done. If the index needs to be modified (step 1210=YES), method 1200 gets the start time (step 1220), modifies the index (step 1230), then gets the end time (step 1240). The difference between the end time and the start time is the time required to modify the index, which is then stored in the Cost field of the maintenance statistics table 950 in FIG. 9. For each component in the index (step 1250), if the component was not modified (step 1260=NO), the next component is considered. If the component was modified (step 1260=YES), the maintenance statistics table is updated to add the information regarding the modified component (step 1270). If there are more components in the index to process (step 1280=NO), method 1200 loops back to step 1250 to consider the next component. If there are no more components in the index to process (step 1280=YES), method 1200 is done. Method 1200 stores information regarding the cost of modifying the different components of an index, which provides more information regarding whether a new index should be created or whether this index should be discarded.

Figure 13:
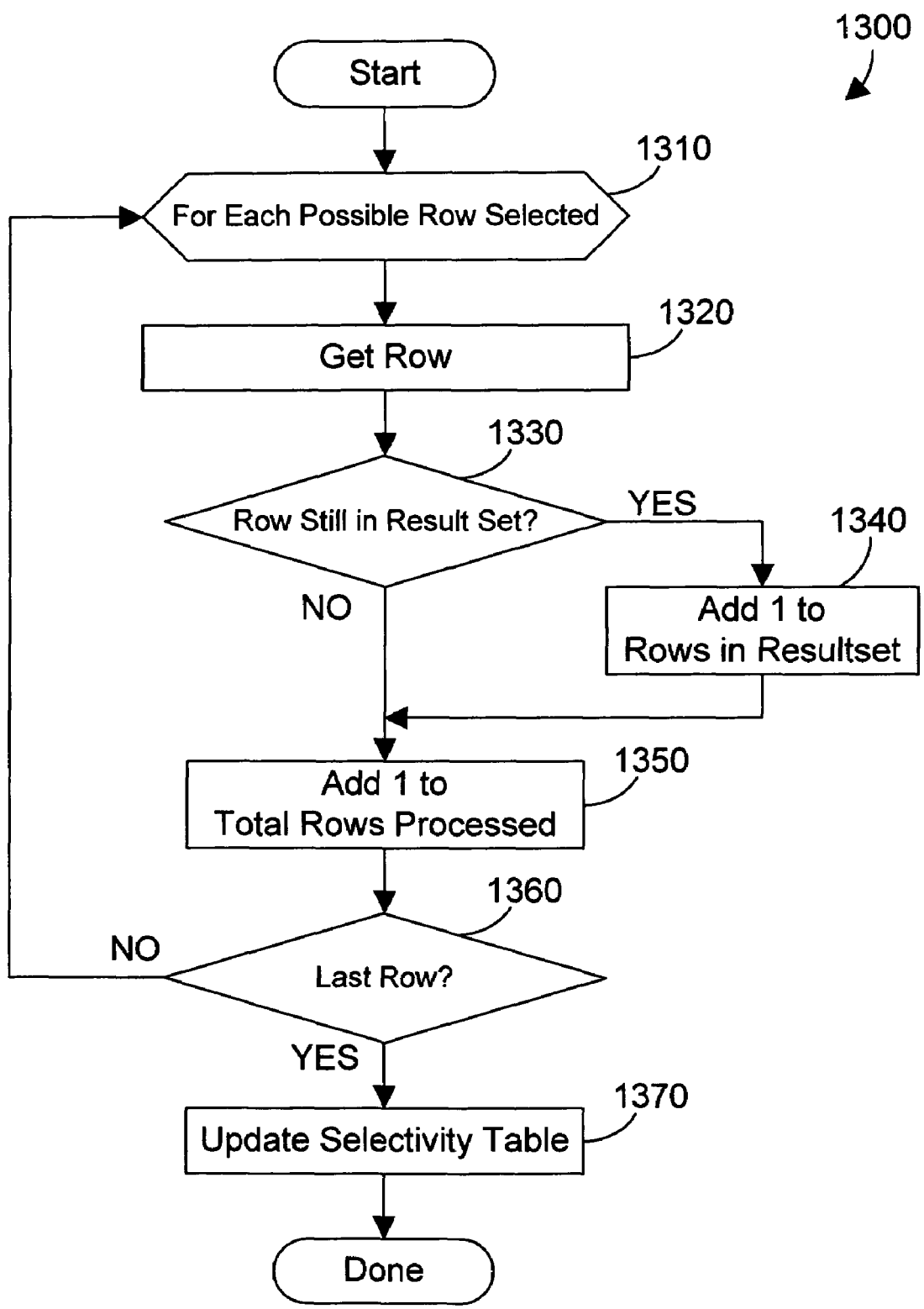
FIG. 13 is a flow diagram of a method for compiling selectivity statistics in an index when the index is used to run a query in accordance with the preferred embodiments.

The index component monitoring mechanism 128 may also write information to the index relating to the run-time performance of the index when used to execute a query. Referring to FIG. 13, method 1300 is performed when executing a query using an index. For each possible row selected (step 1310), get the row (step 1320). If the row is still in the result set (step 1330=YES), add one to the Rows in Resultset (step 1340). Then add one to the Total Rows Processed (step 1350). If there are more rows to process (step 1360=NO), method 1300 loops back to step 1310 and continues. If this is the last row (step 1360=YES), the selectivity table 960 in FIG. 9 is updated to reflect the final Rows in Resultset and Total Rows Processed for the query. In this manner, the selectivity of the query results may be determined from data stored in the index to determine whether the index is useful in executing a query.

The preferred embodiments herein relate to an index that includes statistics regarding usage of its components, and a mechanism for monitoring the use of the index and storing information regarding the usage in the index. Once this information resides in the index, it may be used in a number of different ways. For example, this information could be used to determine whether an index should be discarded and whether a new, more efficient index should be built. In addition, this information could also be used to measure the cost of maintaining the index. The information stored in the index could be displayed to a system administrator via a graphical user interface. In the alternative, the information stored in the index could be used by a query optimizer or other software tool to autonomically create and discard indexes according to the information stored in the index regarding the usage of its components. The preferred embodiments expressly extend to any and all ways of using data corresponding to the usage of components that is stored in the index.

The preferred embodiments provide an enhanced index that includes fields for storing usage data for the components of the index. Usage of the index is monitored, and information regarding the usage is stored in the fields in the index. This detailed information in the index regarding its components allows more intelligently determining when to discard an index, when to create a new index, and how effective an index is being used in processing queries.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for monitoring usage of a plurality of components within a database index, each of the plurality of components corresponding to a column in a database table, the method comprising the steps of:
   (A) providing a plurality of fields in the database index, wherein the plurality of fields include:
   an indication of how one of the plurality of components have been used;
   a correlation of the plurality of components to a corresponding plurality of query identifiers to indicate each query that used a corresponding one of the plurality of components in the database index;
   a plurality of last used timestamps correlated to a corresponding plurality of query identifiers to indicate a timestamp for each query that used the database index;
   maintenance statistics that indicate which components in the database index were modified when the database index was modified;
   (B) monitoring usage of the plurality of components in the database index;
   (C) writing to the plurality of fields information regarding the usage of the plurality of components in the database index;
   (D) using the information in the database index regarding the usage of the plurality of components in the database index to determine when to discard the database index; and
   (E) using the information in the database index regarding the usage of the plurality of components in the database index to determine when to create a new database index.

* * * * *